Sept. 12, 1944.  M. H. ITTNER  2,357,829
DISTILLATION
Filed July 23, 1940

HEATER AND INNER CYLINDER

INVENTOR
Martin Hill Ittner
BY
Trenton Meredith Ralph Carlisle Smith
ATTORNEYS

Patented Sept. 12, 1944

2,357,829

UNITED STATES PATENT OFFICE 2,357,829

DISTILLATION

Martin Hill Ittner, Jersey City, N. J., assignor to Colgate-Palmolive-Peet Company, Jersey City, N. J., a corporation of Delaware Application July 23, 1940, Serial No. 346,970

10 Claims. (Cl. 202—53)

This invention is directed to a method and apparatus for distilling high boiling liquids and more particularly it relates to the distillation of fatty acids.

A considerable number of different methods involving a great variety of apparatus have been employed in the distillation of high boiling liquids. Under the designation of high boiling liquids I include fatty acids, higher boiling petroleum fractions and many other materials which are, or may be, purified by distillation. The very nature of these bodies necessitates the employment of rather high temperatures for their distillation, and many of them are sufficiently affected by high temperatures to suffer appreciable decomposition. There are three factors which militate against ideal results in the distillation of some high boiling liquids. These are the high temperatures required for distillation, contact with atmospheric air at elevated temperatures, and the length of time required to complete the distillation. In the case of many substances the first two of these factors are removed or substantially lessened by the employment of diminished pressure, or steam distillation, and preferably a combination of the two. In the case of more sensitive bodies the employment of so-called "high vacua," or very low absolute pressures, is very helpful as these depress very considerably the temperature of distillation and at the same time remove air to such a degree that its harmful influence is greatly lessened. The simultaneous employment of steam at low absolute pressures is helpful in still further depressing the effective temperature of distillation, and in more completely excluding air with its harmful influence.

In most types of batch distillation the process is a progressive one with the last portions of the product remaining in the still exposed to heat and harmful chemical influences, such as cracking and polymerization, resulting in volatile impurities and an accumulation of higher boiling and tarry matters in the residue. These latter during distillation are projected into the fast rising vapors and are entrained with them to a degree that requires unusually efficient means of separation to prevent them from finding their way into the condensers where they contaminate the distillate.

An additional disadvantage is met with in batch distillation of mixtures of ingredients having appreciably different boiling points, as with petroleum products, and fatty acids, for the more volatile ingredients pass over faster at first and the higher boiling portions remain until the end. This necessitates a gradual raising of the still temperature, and the higher boiling material along with the polymerization products and the residue suffer from a very protracted cooking at the highest temperature employed and any attempt to avoid excessive temperatures at the end of the run can result only in lessened yield by leaving some of the desirable portion behind in the residue.

One means of attempting to avoid some of the difficulties mentioned above is to employ the so-called 'flash distillation" method. By this procedure the crude material to be distilled is heated rapidly in pipe stills to a very high temperature, much above the temperature of the actual distillation, the object being to store up in the material while still in liquid condition enough heat units above the temperature of distillation to supply the latent heat necessary to convert the liquid into vapor almost at once after relieving pressure on the heated material. Although the material by this method is heated for only a comparatively short time, the excessively high temperature that must be employed, often several hundred degrees above the actual distilling temperature, is apt to be very harmful and generally results in more or less undesirable cracking, polymerization and tar formation.

An object of the present invention is to facilitate the distillation of high boiling materials while obtaining an improved distillate. Another object is to provide a means of continuous distillation that will give substantially complete separation of the desirable volatile material from the less desirable substantially non-volatile material. Another object is to obtain a substantially complete separation of entrained material from the distilling vapors while operating at faster rates of distillation than heretofore possible while producing material of good quality without harmfully increasing the pressure differential between the still and the vacuum apparatus. Another object is to avoid the excessively high temperatures necessary for reasonably satisfactory flash distillations. Another object of the process of the invention is to realize substantial heat economies and ease of operation which will work together to lower the cost of distillation. The apparatus of the invention is simple of construction and comparatively inexpensive.

The invention furnishes method and means of continuous distillation of high boiling materials at temperatures very much below their normal boiling points even to substantially complete distillation of the volatile products and removal of the residual material without the necessity of employing excessively high temperatures such as must be used in any method depending entirely on ordinary flash distillation.

A specially favorable feature of the invention is that the means which are helpful in producing certain advantages in one part of the process are helpful in increasing the beneficial results derived from another part of the process. Thus, the method of introducing the crude still feed, while effecting most thorough and even distribution and volatilization, at the same time promotes the separation of entrained material; and vice versa, the method employed for entrainment separation exercises a strong effect in increasing the heat transfer necessary to promote volatilization of the distillable material; and when direct steam is employed in the process, it promotes both indirect heat transfer and entrainment separation. These are in contrast with known methods of distillation in which means of heating and flashing, and steam "stripping," etc., all promote entrainment, and in which one of these means does not supplement all the others beneficially.

The invention provides simple efficient means of heating the still feed quickly and safely to a temperature sufficiently above the temperature of volatilization to induce rapid distillation, but very considerably below the temperatures necessary for ordinary flash distillation depending for complete volatilization on heat stored in the crude, or on heat stored in the crude augmented by the heat in a large weight of highly superheated steam that is used additionally for direct heating. The invention furnishes controlled means of supplying indirect heat in required amount to complete the volatilization of the volatile material without the employment of unnecessarily high temperatures. It also supplies a novel efficient means of effectively and evenly contacting the distilling liquid with the source of invention rapid indirect heat. By means of the invention rapid rates of distillation may be employed, without contamination of the distillate, which heretofore have been impossible of attainment without serious contamination of the distillate.

Other objects and accomplishments of the process and apparatus will be disclosed as the description is unfolded, and especially by reference to the accompanying drawing.

Figure 1:
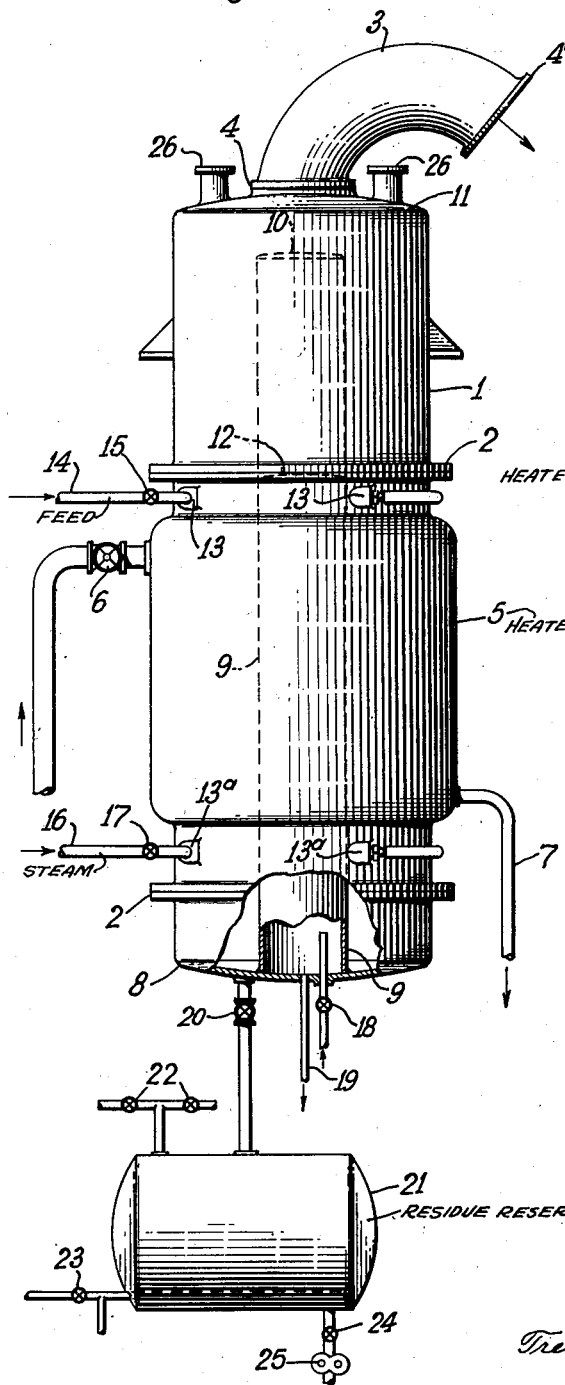
Fig. 1 is an assembled diagrammatic illustration of a still suitable for carrying out the invention when supplied with proper condensers, not shown, and vacuum equipment, not shown, and proper source of heat, not shown, and suitable auxiliaries, not shown.
Figure 2:
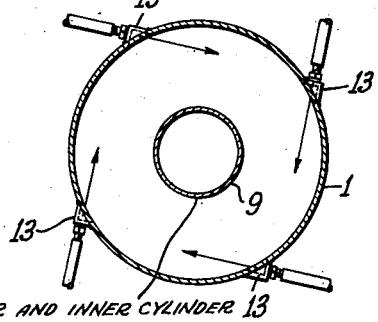
Fig. 2 is a diagrammatic drawing partly in section of a preferred means of introducing feed to the still.
Figure 3:
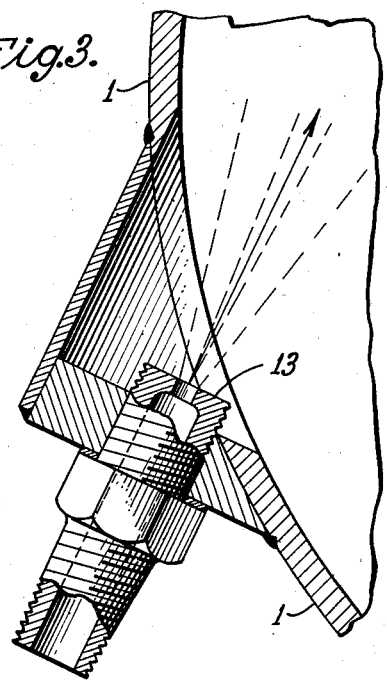
Fig. 3 is an enlarged detailed drawing partly in section of one of the injection nozzles that may be employed to introduce feed to the still.

A more detailed description of the apparatus of Fig. 1 is as follows: A vertical still 1 is constructed in parts held together vacuum tight by flanges 2 and connected to gooseneck 3 by flange 4. The middle section of the still is provided with a heating jacket 5 connected to a source of heat, as diphenyl vapor supplied from a heating boiler not shown and controlled by valve 6, the condensed liquid from the heating vapor returning to the heating boiler from the jacket by pipe 7. The bottom section 8 of the still is provided with and tightly attached to a central hollow drum 9 having an outer diameter preferably about one third the inner diameter of the still. Inner drum 9 should be vertical and parallel to the axis of the still and accurately placed in the still so as to leave substantially equal space around it and between it and the still wall. The upper end 10 of inner drum 9 should be rounded with a curvature approximating the curvature of the still dome 11, and should be spaced about 3/4 of its diameter from the top of the still. It is desirable that the upper part of drum 9 shall be blocked off from the lower part by vapor tight partition 12, preferably located about on the level at which the crude feed material is introduced into the still 1 through nozzles 13, connected with a manifold pipe not shown, and supplied by pipe 14 through control valve 15. The lower part of still wall 1 is supplied with nozzles 13a, which may be similar to nozzles 13, and which are connected to a manifold not shown and may be supplied with superheated steam by pipe 16 from a source not shown, in amounts controlled by valve 17 or otherwise. Inner drum 9 may be supplied with hot vapor, as for instance diphenyl vapor, through valve 18 and any liquid condensed from the heating vapor within drum 9 may be conducted back to the heating boiler through pipe 19. The still is supplied with a runoff so that residue may be removed at will or substantially continuously through valve 20 to drum 21. Drum 21 is provided with pipe connections and valves 22 which permit withdrawing air from the drum or breaking vacuum if desired. Drum 21 is also provided with an indirect source of heat, supplied through valve 23, in order to maintain the residue in a liquid condition. It is also supplied with a suitable runoff controlled by valve 24 and provided with pump 25 which permits withdrawal of residue without breaking vacuum. When inner hollow drum 9 is furnished with vapor tight partition 12 the heat supplied through valve 18 is available on the walls of drum 9 up to partition 12 but not above. The still may be provided with peep glasses 26 through which the operation of the nozzles 13 may be observed.

Gooseneck 3 may be connected by means of flange 4a to a condensing system not shown and the condensing system may be connected with a vacuum system not shown. The condensing system should be provided with means for condensing the distilling vapors, preferably by indirect heat transfer, while leaving all or most of any water vapor employed still in vapor form. The water vapor should pass to the vacuum equipment where it can be condensed to water by suitable means employing either direct or indirect cooling means. The vapors from the distillation may be condensed in surface condensers employing indirect heat transfer and the cooling medium may be the crude still feed which thus absorbs heat from the condensing vapors. If the indirect heat transfer be countercurrent in direction the still feed may thus be brought close to the still vapor temperature by employment of recovered heat, thus effecting substantial economies. The distilling vapors may alternatively be condensed by contacting them indirectly with boiling water, and by generation of steam which may be used elsewhere in the process or for other purposes if desired. I find that it is desirable to condense the greater part of the distilling vapors at a comparatively high temperature, as for instance appreciably above 100° C., in order that objectionably smelling impurities, which are commonly also quite volatile, may be permitted to pass onward thus leaving the greater part of the distillate sweet and pure. The more volatile portion of the distillate may then be condensed by itself separate from the main part of the distillate. In case fatty acids are being distilled, the more volatile acids may be almost completely condensed by providing liberal cooling surface cooled to about 70° C. As stearic and palmitic acids, which may be present, solidify slightly below this temperature, it is generally not advisable to use indirect cooling surfaces at much lower temperatures.

In most vacuum systems which operate where water vapor is employed, the water vapor is condensed finally either by direct or indirect cooling means. In either case a small amount of the more volatile portion of the distillate will thus be condensed with the water that is condensed from the water vapors. This may be separated in a "grease trap" or by other suitable means and recovered.

In such operations as one may wish to perform where it is not necessary or desirable to separate the distillate into fractions differing sharply from one another in their physical and chemical properties, the type of condenser described above will prove very satisfactory and it is easily possible to arrange several condensing units in series so that a partial separation of the distillate may be obtained if desirable, satisfactory for many purposes, the less volatile portion condensing first and the more volatile later, all while realizing heat economies through heat exchange for preheating feed and generating steam; but when it becomes desirable to separate the distillate into sharp fractions having quite different properties, one from another, it will be found advantageous to conduct the vapors from gooseneck 3 directly onto the feed plate of a suitable distilling column. A simple column will permit the separation of substantially all the most volatile constituent, present in substantial quantities, from the rest of the higher boiling portion of the distillate. The higher boiling portion may be fractionated still further in another column in known manner or intermediate condensates may be drawn off from various plates or at different levels from the first fractionating column, and by means of stripping steam be caused to yield intermediate fractions of definite degrees of purity.

A desirable method of performing the invention is to take crude fatty acids as for example acids obtained by my process for countercurrent hydrolysis, as disclosed in U. S. Patent No. 2,139,589 which issued December 6, 1938, and in my Reissue Patent No. 22,006, issued January 13, 1942, which have been substantially freed from dissolved and emulsified water, and heat them preferably partially by heat exchange with hot liquid from the hydrolysis. The crude fatty acids thus heated are further heated by indirect heat exchange, as by means of diphenyl vapor, for example to about 271° C. The crude fatty acids feed thus heated is projected through a nozzle, preferably a plurality of nozzles 13, in a substantially horizontal direction between the outer shell 1 and inner drum 9. The nozzles should be so placed as to impel liquid and vapors in the same direction between 1 and 9, all clockwise or all anticlockwise, thus imparting a strong swirling motion to the vapors around inner drum 9. If an absolute pressure of about 6 to 12 mm. mercury is maintained in the still the material thus sprayed will pass to a considerable degree into vapor, the temperature of which will be in the neighborhood of 200° C. when tallow fatty acids are being completely distilled. The vapor thus formed will pass rapidly around the inner drum 9 and upwardly toward gooseneck 3 while still maintaining its rapid circular motion. The non-volatilized portion of the feed comprising unvolatilized fatty acids, and the substantially non-volatile matter, being many times as heavy as the vapor, will be projected in the direction imparted to it by the spray nozzles 13 and, being but slightly diverted from its generally tangential course by the very attenuated vapors, will soon reach the inner side of shell 1 and will flow down the shell and over that portion of the shell heated by jacket 5 and thus receive sufficient heat to volatilize all the remaining volatile matter.

It is very helpful but not necessary to have a lower set of nozzles 13a, below the heating jacket, for steam. These should all be pointed so as to cause the vapors to swirl in the same direction as the swirling vapors from the distilling liquor above. The rising swirling current of steam tends to carry the heavier suspended liquid matter in directions generally tangential to its own course towards the inner wall of still 1 bringing it against a heating surface and thus simultaneously effectively avoiding entrainment.

In this way substantially all the volatile matter will pass into and through gooseneck 3 freed from entrainment, and the liquid matter will be brought into contact with the heating surface.

The amount of superheated steam required to do effective work need not be greater than about 5% to 7% of the weight of the distillate although higher and lower amounts may be used according to the material being used and the absolute pressure maintained in the still. The steam may be superheated by indirect heat, as for example by diphenyl vapors, to about 271° C., more or less. Although jacket 5 will furnish most of the heat applied in the still, it will be found helpful to heat the inner drum 9 up to partition 12 to about the same temperature. This will heat any liquor that may impinge on drum 9 and will also help heat the intermediate space between 9 and 1. Heating drum 9, being almost entirely enclosed within the still, will suffer practically no radiation losses. Nozzles 13 and 13a may be made of proper size or they may be made slightly larger than necessary and auxiliary nozzles or orifices, not shown, in the feed and steam lines may control accurately the amount of feed and steam used. These auxiliary nozzles or orifices may be placed in lines that are by-passed while the auxiliary nozzles are being changed if it becomes necessary to change them, and they may be changed while the still is in operation.

Means, not shown, may be supplied to indicate or record the temperature of the heating media used in jacket 5 and drum 9; also the temperature of the preheated feed, the superheated steam and the vapor in gooseneck 3, as well as the absolute pressure within the still.

By the time the liquid running down the hot sides of jacket 5 reaches the bottom of the still substantially all of the volatile matter will have passed off and only residue will have reached the bottom of the still where it can be drawn off to drum 21 through valve 20.

In some instances and for some purposes it may be advisable to put some packing material, as for instance Berl saddles, in the lower portion of the space between 9 and 1. It is desirable to keep the packing materials beneath the nozzles 13a at which the swirl-producing superheated steam enters in order not to interfere with the swirl-producing effect of the superheated steam, the value of which has been already pointed out.

I have called attention to some of the shortcomings of ordinary flash distillation, especially to the two most notorious of these, the common practice of greatly overheating the feed, and the promotion of entrainment rather than prevention thereof. However, with the aid of the present invention, flash distillation may be greatly improved and carried out with a very minimum of injury to the distillate with substantially complete absence of entrainment impurities therein. I may, for example, while operating on crude fatty acids derived from hydrolysis of cocoanut oil, heat these indirectly, substantially free from dissolved or emulsified water, to a temperature of about 298° C. by passing them rapidly under pressure through a pipe provided with a suitable means of supplying heat, as for example diphenyl vapor, and inject them thus heated under pressure through nozzles 13 into a hot still operating under low absolute pressure, as for example 6 mm. absolute pressure. Under such circumstances all, or substantially all, of the cocoanut fatty acids will volatilize almost instantly on release of the pressure and the vapors thus formed will also almost instantly be freed from any unvolatilized material and pass out of gooseneck 3 to the condensers or distilling column in pure condition, while the unvolatilized material, following directions generally tangential to the course of the vapor, will come in contact with the wall of the still and thus be permanently removed from the vapors as a contaminating material and will find its way rapidly to the bottom of the still where it may be removed through valve 20 to drum 21. When operating the still entirely on the flash principle it will not be necessary to supply heat through jacket 5 and drum 9 except perhaps to overcome radiation losses, but in any event it is important to provide good heat insulation to the still and gooseneck and to any auxiliary part of the equipment where heat helpful to the process might be dissipated to the atmosphere or otherwise. It is desirable in flash distillation by the present invention to supply a small amount of superheated steam through nozzles 13a, it being unnecessary to superheat it to any higher temperature than applied to the feed just before injection through nozzles 13. The amount of steam thus injected through nozzles 13a need not be over about 5% to 7% of the weight of the feed taken, though more or less may be employed, its principal use being to help maintain the beneficial swirling motion in the vapors within the still while it also adds some heat that goes to make up for some heat that may be lost to the process.

In operations where tallow fatty acids are flash distilled by the process of the invention a temperature about 12° C. higher than recommended for cocoanut fatty acids will be found to give good distillation, if other important details pointed out are complied with, without the necessity of resorting to the excessively high and damaging temperatures heretofore commonly used.

It will also be understood that the process is a flexible one and is not alone operable under fixed, confined, temperatures, pressures and amounts. While it has been shown that a preferred method of operation is to preheat the feed somewhat above the temperature of the vapor as it leaves the still through gooseneck 3, and to supply another portion of the heat necessary to complete volatilization of the volatile matter through heating elements 5 and 9, and it has also been shown that substantially all of the heat necessary for the separation of volatile matter may be supplied to the feed while taking advantage in the volatilization of the novel features of the invention, it should also be pointed out that most of the heat requisite for the volatilization may be supplied through heating elements 5 and 9 by employing the feed at a lower temperature; but it is undesirable to supply feed at any lower temperature than the temperature of the vapors within the still as this would lessen the efficiency of the still.

The process may be operated with or without the employment of steam, as that which is injected through nozzles 13a, but the advantages of using some steam, as recommended, are so great that it will be found advantageous to use it in most cases. It is undesirable to inject steam at any lower temperature than that of the distilling vapor within the still as this would rob heat from the process where it is most needed. It is advantageous, however, that the steam employed shall be superheated somewhat above the temperature of the distilling vapors within the still although it is entirely unnecessary that it be raised to the extreme and harmful degrees of superheat commonly employed in conjunction with ordinary flash distillation. When steam heated as recommended is used in the process of the invention it adds some heat where it has a salutary effect, and also has the effect of rendering volatile matter more volatile, thus lowering the effective temperature of volatilization, in addition to the novel and very helpful feature of promoting separation of unvolatilized matter without detracting from its other advantages.

While the process thus far described provides for the substantially complete volatilization and removal of the volatile matter, it may be found desirable in some instances to modify the process, as for example by leaving a portion of the volatile matter unvolatilized to be removed with the residue. This may be accomplished by lessening the amount of heat supplied with a given amount of feed taken, or by increasing the amount of feed without lessening the heat supplied. An advantage in operating in this way is that it provides a simple method of segregating the last fraction of volatile matter which is generally of lower quality than the main body of the distillate. In operating in this way the residue containing some unvolatilized volatile matter may be drawn off through valve 20 continuously and, while still hot, be sent direct to a second still, not shown, preferably of the same type, which may be smaller. It will be found desirable, however, to put this residue in its passage to the second still through an indirect heat exchanger where it may be reheated to a temperature above the temperature of the vapor within the second still. The vapor issuing from the second still may go to a separate condenser which may be connected to the same vacuum system as the first still or to a separate one, or in cases where it is not desirable to segregate portions of the condensate the vapor of the second still may be commingled with the vapor of the first still beyond the goosenecks before entering the condensing system. It will be found that where a second still operating in accordance with the invention is thus supplied in tandem with the first, the distillate from the second still, though generally somewhat higher boiling than the main portion of the distillate, will be very much superior in quality to the redistilled residues heretofore obtained which are ordinarily very inferior due to cracking and high tar entrainment.

While I have described the invention as pertaining to the distillation of high boiling liquids and more particularly to the distillation of fatty acids, it is not to be inferred therefore that the invention is not advantageously applicable in its novel features to the distillation of lower boiling liquids or even to the distillation of liquids in general, the term "high boiling" being used more in a relative than in an absolute sense. Where direct steam is used in connection with the invention, separation of the condensed distillate from the steam is facilitated where the distillate has an appreciably higher boiling point than water.

While I have endeavored to give in my disclosure definite apparatus, and methods that may be performed therein, so that anyone skilled in the art may find nothing lacking for carrying out the invention, I do not confine myself herein to the exact methods or to the exact means disclosed, as these may obviously be varied without departing from the broad, novel features which constitute the invention. I have for example shown a vertical cylindrical still with a smaller, cylindrical inner heating dome within, the free space between these being approximately 90% of the volume of the still. I have described the appurtenances and arrangements that will enable one to carry out the invention, but I may also operate very advantageously with a still of a generally globular shape with an inner bulbous heating dome leaving a substantially even space between the inner surface of the still shell and bulbous heating dome which may vary anywhere from appreciably under 90% to even more than 95% of the space within the still, while taking advantage of the principles of the invention without departing therefrom. I may even construct a still and operate it successfully in accordance with the invention without employing an inner cylinder or inner bulb, by careful adjustment and proportioning of the various nozzles so as to produce an even swirl within the still with substantial avoidance of short circuits, countercurrents, or cross currents; but I prefer the employment of the inner heating cylinder or bulb as with its use I am not only enabled to add more heat in a part of the still where it is advantageous to do so, but I can be assured of substantially complete absence of harmful vapor currents, thus giving a positive removal of entrained matter. The actual space occupied by an inner dome or bulb may easily be less than 10% of the whole and the general efficiency of the apparatus and even the capacity of the still is increased by its employment. Furthermore, I have cited for example the use of diphenyl vapor as a source of heat for the jacket and inner heating dome but I may obviously use other means of heating as for example diphenyl-oxide vapor or a mixture of diphenyloxide and diphenyl vapor, or other heating vapors possessing the requisite physical properties. I may even apply heat in desired amounts to desired portions of the apparatus by electrical induction heating, or by other electrical means, or by other means.

While a definite still has been illustrated and described it is to be understood that the process of the invention is not to be restricted to any one structure but that other structures within the scope of the disclosures and claims may be employed.

I claim:

1. An apparatus suitable for the distillation of high boiling liquids comprising a still shell with a vapor outlet centrally placed at its top, a heating surface within said still and centrally placed therein so as to leave a substantially free, even space around it within the shell of said still, said free space occupying more than about 80% of the space within the shell of said still, means providing for indirectly heating at least a portion of the shell of said still, injection nozzles for injecting feed liquid to be distilled substantially horizontally within said free space at an angle at the point of injection of about 45° with the wall of said still above at least a portion of the indirectly heated still shell, means near the bottom of said still for injecting steam substantially horizontally in controlled amounts into said free space at an angle at the point of injection of about 45° with the wall of said still, means for condensing the vapors from said still and means for removing non-volatilized matter from said still.

2. In the distillation of high boiling liquid without substantial chemical change, the steps comprising heating said liquid as still feed under pressure to a temperature in excess of the distilling temperature employed within a still, said temperature of heating being not higher than the boiling point of said liquid at the pressure under which it is heated, thus assuring the presence of volatile liquid in liquid condition in said still feed, and injecting said heated liquid still feed wth simultaneous reducton in pressure, into said still, with volatilization of at least a portion of said liquid, the general direction of said injecting being substantially horizontal inwardly at an angle substantially less than 90° and substantially more than 0° with the wall of said still, the vapors thus formed being forced in passage through and from the still to follow generally spiral paths within a free space between two surfaces having substantially concentric, circular horizontal cross sections.

3. In the distillation of liquid without substantial chemical change, the process comprising preheating said liquid in liquid condition under pressure to a temperature above the temperature requisite for the volatilization of said liquid in a still at the pressure at which said volatilization occurs, injecting said preheated liquid inwardly chordwise into said still with substantial reduction of pressure and volatilization of a portion of said liquid with formation of vapors, substantially simultaneously freeing the vapors thus formed from unvolatilized matter, said volatilization and substantial freeing of unvolatilized matter from said vapors being effected within a free space in said still between two surfaces having substantially concentric, circular horizontal cross sections, said substantial freeing of vapors from unvolatilized matter being effected by forcing said vapors to follow substantially spiral paths in their upward passage through said free space.

4. In the distillation of high boiling liquid without substantial decomposition, the process which comprises the steps of preheating said liquid under pressure sufficient to prevent substantial vaporization thereof during said preheating, the temperature of said preheating being above the boiling point of said liquid under an absolute pressure of about 25 mm. mercury, injecting said preheated liquid into a still operating at absolute pressure under about 25 mm. mercury, the general direction of said injecting being substantially horizontal inwardly chordwise and at an angle of about 45° with the wall of the still, said injecting being into vapor space within said still between two surfaces having substantially concentric, circular horizontal cross sections, the vapors formed in said vapor space being thus substantially freed from unvolatilized matter by impingement thereof against said surfaces, conducting the vapors through a vapor outlet located substantially above the level of said injecting and then condensing the vapors.

5. A process as in claim 4 in which a portion of at least one of said surfaces defining the vapor space within the still supplies additional heat to effect volatilization.

6. A process as in claim 4 in which the vapors from said high boiling liquid are fractionally condensed.

7. A distilling apparatus for distilling volatile liquids without substantial chemical change comprising a still, said still being provided with means for heating liquid feed to be distilled, means for maintaining sufficient pressure on said liquid feed during said heating to keep liquid feed in a liquid state, means for releasing pressure on said heated liquid feed and simultaneously injecting it substantially horizontally into the vapor space of said still, said injection being at an angle with the wall of the still substantially less than 90° and substantially greater than 0°, said vapor space being largely between two surfaces having substantially concentric, circular, horizontal cross sections throughout the major portion of the height of said vapor space, at least one of said two surfaces being provided with indirect heating means for a portion of said surface situated beneath the level at which said feed is injected into said vapor space, a vapor outlet connected with the upper part of said vapor space, and means for condensing vapors from said still.

8. A still as in claim 7 provided with means for maintaining a vacuum within said vapor space and vapor outlet.

9. A distilling apparatus for distilling volatile liquids without substantial chemical change comprising a still, said still being provided with means for heating liquid feed to be distilled, means for maintaining sufficient pressure on said liquid feed during said heating to keep the liquid feed in a liquid state, means for releasing pressure on said heated liquid feed and simultaneously injecting it substantially horizontally into the vapor space of said still, said injection being inwardly at an angle with the wall of the still substantially less than 90 degrees and substantially greater than zero degrees, means for injecting steam substantially horizontally into said vapor space at a level below the injection of the feed to said vapor space, the general horizontal direction of said steam after injection into said vapor space being substantially the same as the general horizontal direction of the said feed after injection into said vapor space, said vapor space being largely between two surfaces having substantially concentric, circular horizontal cross sections throughout the major portion of the height of said vapor space, at least one of said two surfaces being provided with indirect heating means for a portion of said surface situated beneath the level at which said feed is injected into said vapor space, a vapor outlet connected with the upper part of said vapor space, and means for condensing vapors from said still.

10. The process of distilling volatile fatty matter which comprises heating said fatty matter under pressure to a temperature at which a portion of said fatty matter would become volatilized at a lower pressure, injecting said heated fatty matter through a wall of a still into the vapor space thereof with reduction of pressure and simultaneous volatilization of a portion of said fatty matter, the pressure within the vapor space of said still being maintained at a low absolute pressure, the direction of injecting said fatty matter into said still being inwardly chordwise and generally horizontal for causing the unvolatilized portion of said fatty matter to impinge against the walls of said still at substantially acute angles, substantially freeing the vapors from the unvolatilized matter with the aid of vapor circulation induced by said inward chordwise injecting, supplying indirect heat to the unvolatilized fatty matter at and below the points of impingement, supplementing said vapor circulation with the inward chordwise injection of hot steam so directed into said vapor space as to contact the heated unvolatilized matter with the volatilization of at least a further portion of said volatile fatty matter.

MARTIN HILL ITTNER.